(12) United States Patent
Shah

(10) Patent No.: US 12,456,082 B2
(45) Date of Patent: *Oct. 28, 2025

(54) SYSTEM AND METHOD OF TANK-BASED PRODUCTION PLANNING

(71) Applicant: Blue Yonder Group, Inc., Scottsdale, AZ (US)

(72) Inventor: Piyush Shah, Kolkata (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 16 days.

This patent is subject to a terminal disclaimer.

(21) Appl. No.: 18/768,756

(22) Filed: Jul. 10, 2024

(65) Prior Publication Data

US 2024/0362560 A1 Oct. 31, 2024

Related U.S. Application Data

(63) Continuation of application No. 18/510,015, filed on Nov. 15, 2023, now Pat. No. 12,056,639, which is a (Continued)

(51) Int. Cl.
*G06Q 10/00* (2023.01)
*G06Q 10/04* (2023.01)
(Continued)

(52) U.S. Cl.
CPC ....... *G06Q 10/06315* (2013.01); *G06Q 10/04* (2013.01); *G06Q 10/06312* (2013.01); *G06Q 10/08* (2013.01)

(58) Field of Classification Search
None
See application file for complete search history.

(56) References Cited

U.S. PATENT DOCUMENTS 5,630,070 A 5/1997 Dietrich et al.
5,943,484 A 8/1999 Milne et al.
(Continued)

OTHER PUBLICATIONS

GR Parija, BR Sarker (Operations planning in a supply chain system with fixed-interval deliveries of finished goods to multiple customers)—IIE transactions, 1999—Springer (Year: 1999).*

(Continued)

*Primary Examiner* — Hafiz A Kassim
(74) *Attorney, Agent, or Firm* — Spencer Fane LLP; Steven J. Laureanti

(57) ABSTRACT

A system and method of a multi-level tank-based production system. Embodiments include planning data for one or more finished goods, the one or more finished goods produced from one or more semi-finished goods stored in one or more tanks, identifying, from the planning data, planned production orders for the one or more finished goods in each time bucket of a planning period, modifying the planned production orders to satisfy lot-size requirements of production operations of the one or more finished goods and time and tank capacity constraints of the one or more semi-finished goods, generating a tank-based production plan based, at least in part, on the modified planned production orders, and producing the one or more finished goods according to the tank-based production plan.

17 Claims, 4 Drawing Sheets

Related U.S. Application Data continuation of application No. 17/468,113, filed on Sep. 7, 2021, now Pat. No. 11,853,946.

(60) Provisional application No. 63/075,600, filed on Sep. 8, 2020.

(51) Int. Cl.
*G06Q 10/0631* (2023.01)
*G06Q 10/08* (2023.01)

(56) References Cited

U.S. PATENT DOCUMENTS

| | | | |
|---|---|---|---|
| 6,701,201 | B2 | 3/2004 | Hegde et al. |
| 7,292,904 | B2 | 11/2007 | Denton et al. |
| 7,379,781 | B2 | 5/2008 | Treichler et al. |
| 7,444,294 | B2 | 10/2008 | Nomoto et al. |
| 7,490,027 | B2 | 2/2009 | Retsina |
| 7,617,015 | B2 | 11/2009 | Steinbach et al. |
| 7,801,753 | B2 | 9/2010 | Vemula et al. |
| 7,860,737 | B2 | 12/2010 | Jordan et al. |
| 8,429,035 | B1 | 4/2013 | Kamath et al. |
| 8,799,113 | B2 | 8/2014 | Markham et al. |
| 10,325,237 | B2 | 6/2019 | Kamath et al. |
| 2002/0156663 | A1 | 10/2002 | Weber et al. |
| 2003/0126005 | A1 | 7/2003 | Liao et al. |
| 2003/0149631 | A1 | 8/2003 | Crampton et al. |
| 2003/0150909 | A1* | 8/2003 | Markham ............ G06Q 10/06 235/376 |
| 2008/0154660 | A1* | 6/2008 | Steinbach ............ G06Q 10/06 705/7.11 |
| 2011/0258087 | A1 | 10/2011 | Ghosh et al. |

OTHER PUBLICATIONS

T Zhang, Y Zhang, X Bai, D Jin et al. (Research on the MTO-MTS Production Management of Steel-Iron Factories—2011—IEEE) (Year: 2011).*

Zhang et al., "Research on the MTO-MTS Production Management of Steel-Iron Factories" 2011—IEEE. (Year: 2011).

Dickersbach, J.T. "Supply Chain MAnagement with APO" Springer-Verlag Berlin Heidelberg 2004. (Year: 2004).

Chen et al., "Capacity planning for packaging industry" Journal of manufacturing systems, 2017—Elsevier (Year: 2017).

Parsanejad et al., "Inventory-Production System Subject to Production Constraints with Non-Zero Target Inventory" Innovation and Supply Chain Management, vol. 9, No. 1, pp. 025-029, Mar. 2015 (Year: 2015).

* cited by examiner

US 12,456,082 B2

SYSTEM AND METHOD OF TANK-BASED PRODUCTION PLANNING

CROSS-REFERENCE TO RELATED APPLICATIONS

This application is a continuation of U.S. patent application Ser. No. 18/510,015, filed Nov. 15, 2023, entitled "System and Method of Tank-Based Production Planning," which is a continuation of U.S. patent application Ser. No. 17/468,113, filed Sep. 7, 2021, entitled "System and Method of Tank-Based Production Planning," now U.S. Pat. No. 11,853,946, which claims the benefit under 35 U.S.C. § 119(e) to U.S. Provisional Application No. 63/075,600, filed Sep. 8, 2020, entitled "System and Method of Tank-Based Production Planning." U.S. patent application Ser. No. 18/510,015, U.S. Pat. No. 11,853,946, and U.S. Provisional Application No. 63/075,600 are assigned to the assignee of the present application.

TECHNICAL FIELD

The present disclosure relates generally to supply chain planning and specifically to production planning for tank-based production.

BACKGROUND

This paper presents an alternative approach to address the synchronized and integrated two-level lot sizing problem. In the beverage industry manufacturing environment, tank-based production is interdependent upon packaging operations and the tank storage of beverage materials. When manufacturing decisions are made by linear programming one of the key limitations has been the ability to plan the production of items in continuous variable and not discrete batches. Typical post-process lot sizing may produce distorted optimization results, which impacts shelf life, capacity, and cost. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
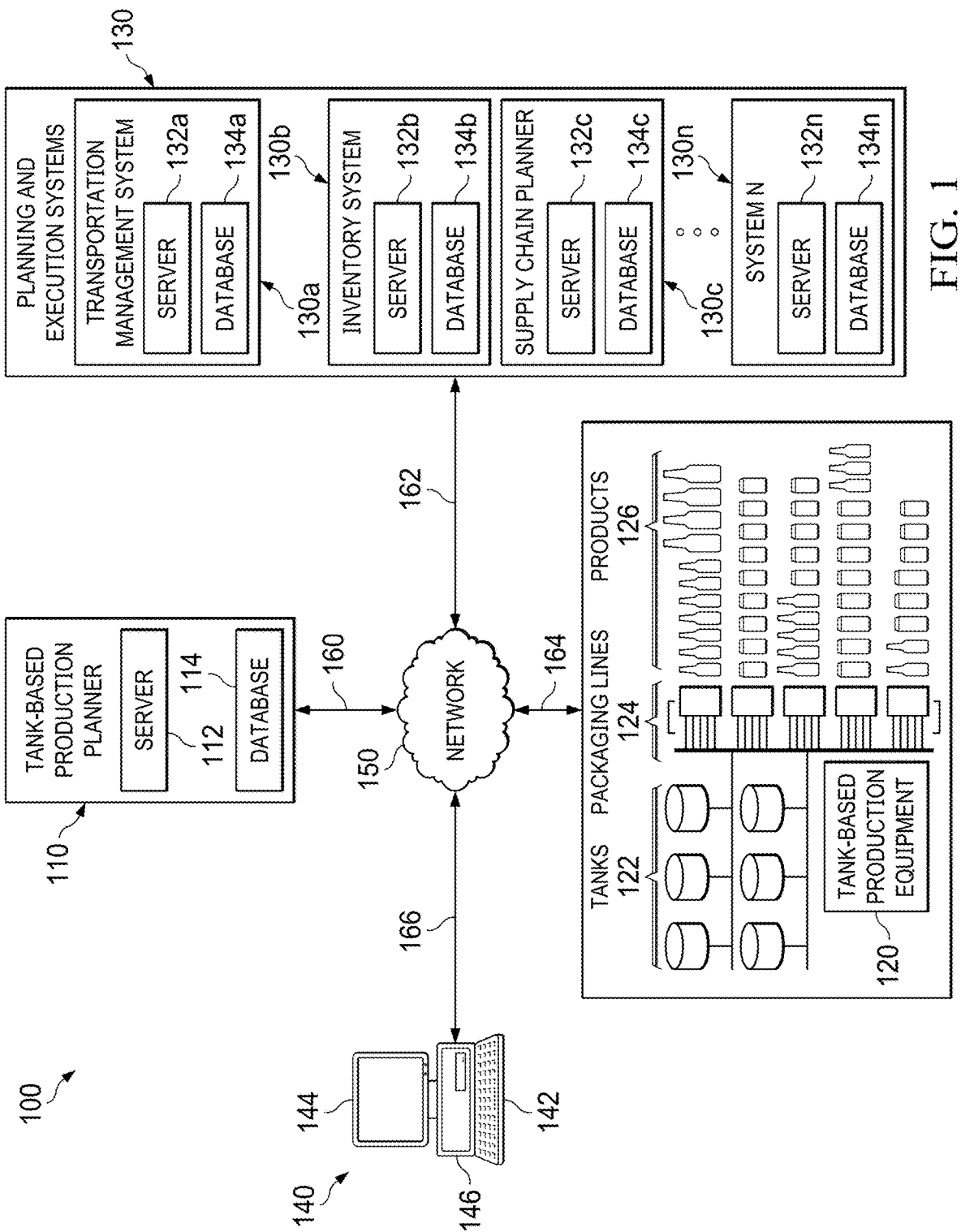
FIG. 1 illustrates a multi-level tank-based production system, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates multi-level tank-based production system 100, in accordance with a first embodiment. Multi-level tank-based production system 100 comprises tank-based production planner 110, tank-based production equipment 120, one or more planning and execution systems 130, computer 140, network 150, and communication links 160-166. Although a single tank-based production planner 110, a single assemblage of tank-based production equipment 120, one or more planning and execution systems 130, a single computer 140, and a single network 150 are shown and described, embodiments contemplate any number of tank-based production planners, assemblages of tank-based production equipment, planning and execution systems, computers, or networks, according to particular needs.

In one embodiment, tank-based production planner 110 comprises server 112 and database 114. Multi-level tank-based production utilizes synchronized and integrated lot-sizing for at least two levels of a production process. Server 112 of tank-based production planner 110 comprises one or more modules that provide customizable post-heuristic production planning to improve tank utilization for multi-level tank-based production. After receiving planning data from supply chain planner 130c, tank-based production planner 110 generates a new production plan that resolves the unfeasibility from linear programming (LP) optimization and nonsynchronous lot-sizing in the planning data. According to embodiments, server 112 of tank-based production planner 110 stores data at database 114 of tank-based production planner 110. In addition, or as an alternative, tank-based production planner 110 communicates instructions to tank-based production equipment 120 to produce products according to one or more production plans.

Tank-based production equipment 120 comprises one or more tanks 122 and one or more packaging lines 124. One or more tanks 122 hold materials that are produced or stored in a tank. In one embodiment, the tank-stored materials comprise beverages, such as, for example, a soft-drink, beer, or other like beverages. One or more packaging lines 124 package the tank-stored materials to generate one or more products 126. By way of example only and not by way of limitation, a beverage manufacturer stores a fluid with limited-shelf life in the one or more tanks and packages the fluid in one or more bottles, cans, or other like containers, where the fluid has a much longer shelf life. For example, soft-drink syrup or fermented beer may have a shelf life from one through four weeks in a tank, whereas the packaged soft-drink or packaged beer may have a shelf life of a year or more in a bottle, can, or other like container.

Multi-level tank-based production utilizes one or more tanks 122 and one or more productions lines 124 in at least two interdependent levels. The first level comprises the packaging operation of one or more products 126, which may be referred to as a finished good. The second level comprises the storage of the tank-based materials in one or more tanks 122, wherein the tank-based materials may be referred to as semi-finished goods. The packaging operation of one or more products 126 (finished goods) in the first level must respect a minimum lot-size requirement, and the storage of the tank-based materials (semi-finished goods) in one or more tanks 122 must respect time and capacity constraints as well as lot-size requirements. Tank utilization is planned in batches, the size of which corresponds to the tank capacity, the minimum lot-size requirement of the packaging operations, or other suitable batch sizes. For example, a beverage manufacturer may produce batches of beverages having batch sizes of, for example, 2500 liters, 5000 liters, or other suitable batch sizes, which are stored in one or more tanks 122. The packaging operations transfers liquid from one or more tanks 122 to packages of one or more products 126, which may be restricted by a minimum lot size, such as, for example, 10,000 cases, 15,000 cases, or other suitable minimum lot sizes.

As described in further detail below, tank-based production planner 110 increases the utilization of one or more tanks 122 and decreases the amount of spoilage caused by post-optimization lot-sizing production quantities, by, among other things, reducing the duration that partially-consumed material remains in one or more tanks 122 and reducing the quantity of one or more tanks 122 storing partially-consumed material. Although particular batch sizes and lot sizes are described, embodiments contemplate batch sizes and lot sizes of any suitable quantity or amount (such as, for example, a volume or a weight) or other suitable minimum lot-sizes, according to particular needs.

Embodiments of tank-based production equipment 120 comprise one or more sensors 248 (FIG. 2) that monitor a current state of tank-based production equipment 120. For example, one or more sensors 248 may comprise an imaging sensor, such as, a camera, scanner, electronic eye, photodiode, charged coupled device (CCD), or other like light-sensitive device. One or more sensors 248 comprising the imaging sensor may, for example, detect visual characteristics (such as color, shape, size, fill-level, or the like) of one or more tanks 122 (including a fill-level, a concentration, a current stage of production, or the like) and one or more packaging lines 124 (including, for example, packaging rate, fill-level, a current state of operation, or the like). Embodiments contemplate one or more sensors 248 affixed to one or more tanks 122, one or more packaging lines 124, or other tank-based production equipment 120. In addition, or as an alternative, one or more sensors 248 may be affixed to one or more imaging devices such as, for example, a fixed or mobile scanner (such as, for example, a barcode or other label scanner), and a mobile handheld electronic device (such as, for example, a smartphone, a tablet computer, a wireless communication device, or the like).

In addition, or as an alternative, one or more sensors 248 may comprise a radio receiver and/or transmitter configured to read an electronic tag, such as, for example, a radio-frequency identification (RFID) tag. Each material, product, finished good, semi-finished good, or other like item may be represented in the supply chain network by an identifier, including, for example, Stock-Keeping Unit (SKU), Universal Product Code (UPC), serial number, barcode, tag, RFID, or the like. One or more sensors 248 may be utilized by one or more computers 140 (and/or one or more scanners, mobile handheld electronic devices, wireless communication devices, or the like) to generate a mapping of one or more items in the supply chain network by scanning the item or an identifier or object associated with the item and identifying the item based, at least in part, on the scan. This may include, for example, a stationary scanner coupled with tank-based production equipment 120 that scans items as the items pass near the scanner, such as, for example, each item of one or more products 126 passing near the scanner on one or more packaging lines 124. Transportation management system 130a, inventory system 130b, and supply chain planner 130c may use the mapping of an item to locate the item in the supply chain network comprising multi-level tank-based production system 100. The location of the item is then used to coordinate the storage and transportation of items in the supply chain network according to one or more plans generated by tank-based production planner 110 and supply chain planner 130c. Plans may comprise one or more of a master supply chain plan, a production plan, a demand plan, a distribution plan, and other suitable supply chain plans.

In one embodiment, one or more planning and execution systems 130 comprise transportation management system 130a, inventory system 130b, supply chain planner 130c, and any one or more other supply chain planning and execution systems 130n.

Transportation management system 130a comprises server 132a and database 134a. According to embodiments, transportation management system 130a directs one or more transportation vehicles of a transportation network to ship one or more items between the one or more supply chain entities, based, at least in part, on a supply chain plan (such as, for example, a supply chain master plan, a production plan, or the like), the quantity of items currently in stock at the one or more supply chain entities or other stocking location, the quantity of items currently in transit in the transportation network, a forecasted demand, a supply chain disruption, and/or one or more other factors described herein. The one or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with tank-based production planner 110, transportation management system 130a, inventory system 130b, supply chain planner 130c, and/or the one or more supply chain entities to identify the location of the one or more transportation vehicles and the location of any inventory or shipment located on the one or more transportation vehicles.

Inventory system 130b comprises server 132b and database 134b. Server 132b of inventory system 130b is configured to receive and transmit inventory data, which may include, for example, item identifiers, pricing data, attribute data, inventory levels, and other like data about materials, items, products, and the like, at one or more locations in the supply chain network. Server 132b of inventory system 130b stores inventory data to (and retrieves inventory data from) database 134b of inventory system 130b or from one or more locations in the supply chain network.

According to an embodiment, supply chain planner 130c comprises server 132c and database 134c. Supply chain planner 130c models and solves supply chain planning problems to create supply chain plans. Supply chain planner 130c may receive planning and execution data from any one or more planning and execution systems 130 as an input for modeling and solving the supply chain planning problem. In one embodiment, supply chain planner 130c formulates the supply chain planning problem as an LP supply chain planning problem and solves the LP supply chain planning problem using one or more optimization and heuristic solvers. In one embodiment, supply chain planner 130c solves an LP supply chain planning problem using LP optimization followed by a lot-sizing heuristic solve. Supply chain planner 130c transmits the resulting planning data to tank-based production planner 110, which then applies flexible-capacity method 300 (FIG. 3) or a constrained capacity method 400 (FIG. 4), as described in further detail below.

As shown in FIG. 1, multi-level tank-based production system 100 may operate on one or more computers 140 that are integral to or separate from the hardware and/or software that support tank-based production planner 110, tank-based production equipment 120, and one or more planning and execution systems 130. One or more computers 140 may include any suitable input device 142, such as a keypad, mouse, touch screen, microphone, or other device to input information. Output device 144 may convey information associated with the operation of multi-level tank-based production system 100, including digital or analog data, visual information, or audio information. One or more computers 140 may include fixed or removable computer-readable storage media 146, including a non-transitory computer readable medium, magnetic computer disks, flash drives, CD-ROM, in-memory device or other suitable media to receive output from and provide input to multi-level tank-based production system 100.

One or more computers 140 may include one or more processors and associated memory to execute instructions and manipulate information according to the operation of multi-level tank-based production system 100 and any of the methods described herein. In addition, or as an alternative, embodiments contemplate executing the instructions on one or more computers 140 that cause one or more computers 140 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, multi-level tank-based production system 100 comprises a cloud-based computing system having processing and storage devices at one or more locations, local to, or remote from tank-based production planner 110, tank-based production equipment 120, and one or more planning and execution systems 130. In addition, each of one or more computers 140 may be a workstation, personal computer (PC), network computer, notebook computer, tablet, personal digital assistant (PDA), cell phone, telephone, smartphone, wireless data port, augmented or virtual reality headset, or any other suitable computing device. One or more users may be associated with tank-based production planner 110 or one or more planning and execution systems 130. These one or more users may include, for example, a "manager" or a "planner" handling tank-based production planning, supply chain planning, and/or one or more related tasks within multi-level tank-based production system 100. In addition, or as an alternative, these one or more users within multi-level tank-based production system 100 may include, for example, one or more computers programmed to autonomously handle, among other things, tank-based production planning, demand planning, option planning, sales and operations planning, supply chain master planning, plan adjustment after supply chain disruptions, order placement, automated warehouse operations (including removing items from, and placing items into, inventory), robotic production machinery (including one or more packaging lines 124 and other like production equipment), and/or one or more related tasks within multi-level tank-based production system 100.

As disclosed above, multi-level tank-based production system 100 may be located at one or more manufacturers in a supply chain network. The supply chain network may comprise one or more supply chain entities, such as, for example, one or more manufacturers, suppliers distribution centers, and retailers. One or more manufacturers may be any suitable entities that manufacture at least one product. One or more manufacturers may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item but does not become a part of the item. In one embodiment, one or more manufacturers produce one or more finished goods from a semi-finished good stored in one or more tanks 122. The semi-finished good may comprise a single material which is transferred to different sizes, quantities, and types of containers to generate more than one finished good. One or more manufacturers may, for example, produce and sell one or more products 126 to a supplier, another manufacturer, a distribution center, a retailer, a customer, or any other suitable person or an entity. The one or more manufacturers may comprise automated robotic production machinery that produce products based, at least in part, on a production plan from tank-based production planner 110 or another supply chain plan, the number of items currently or projected to be at one or more stocking locations monitored by inventory system 130b, the number of items currently in transit in the transportation network, a forecasted demand, a supply chain disruption, a material or capacity reallocation, and/or one or more additional factors described herein.

One or more suppliers may be any suitable entity that offers to sell or otherwise provides one or more components to one or more manufacturers. One or more suppliers may, for example, receive a product from a first supply chain entity in the supply chain network and provide the product to another supply chain entity. One or more distribution centers may be any suitable entity that offers to sell or otherwise distributes at least one product to one or more retailers and/or customers. Distribution centers may, for example, receive a product from a first supply chain entity in the supply chain network and store and transport the product for a second supply chain entity. One or more suppliers and one or more distribution centers may comprise automated warehousing systems and distribution systems that automatically remove an item from, or place an item into, inventory or transport products to one or more manufacturers based, at least in part, on a production plan from tank-based production planner 110 or another supply chain plan, the number of items currently or projected to be at one or more stocking locations monitored by inventory system 130b, the number of items currently in transit in the transportation network, a forecasted demand, a supply chain disruption, a material or capacity reallocation, and/or one or more additional factors described herein. One or more retailers may be any suitable entity that obtains one or more products to sell to one or more customers. In addition, one or more retailers may sell, store, and supply one or more components and/or repair a product with one or more components. One or more retailers may comprise any number of online or brick and mortar locations.

Although one or more manufacturers, suppliers, distribution centers, and retailers are shown and described as separate and distinct entities, the same entity may simultaneously function as any one or more manufacturers, suppliers, distribution centers, and retailers. For example, one or more manufacturers acting as a manufacturer could produce a product, and the same entity could function as a supplier to supply a product to another supply chain entity. Although one example of a supply chain network is shown and described, embodiments contemplate any configuration of the supply chain network, without departing from the scope of the present disclosure.

In one embodiment, tank-based production planner 110, tank-based production equipment 120, one or more planning and execution systems 130, and computer 140 may be coupled with network 150 using one or more communication links 160-166, which may be any wireline, wireless, or other link suitable to support data communications between tank-based production planner 110, tank-based production equipment 120, one or more planning and execution systems 130, computer 140, and network 150 during operation of multi-level tank-based production system 100. Although communication links 160-166 are shown as generally coupling tank-based production planner 110, tank-based production equipment 120, one or more planning and execution systems 130, and computer 140 to network 150, any of tank-based production planner 110, tank-based production equipment 120, one or more planning and execution systems 130, and computer 140 may communicate directly with each other, according to particular needs.

In another embodiment, network 150 includes the Internet and any appropriate local area networks (LANs), metropolitan area networks (MANs), or wide area networks (WANs) coupling tank-based production planner 110, tank-based production equipment 120, one or more planning and execution systems 130, and computer 140. For example, data may be maintained local to, or externally of, tank-based production planner 110, tank-based production equipment 120, one or more planning and execution systems 130, and computer 140 and made available to one or more associated users of tank-based production planner 110, tank-based production equipment 120, one or more planning and execution systems 130, and computer 140 using network 150 or in any other appropriate manner. For example, data may be maintained in a cloud database at one or more locations external to tank-based production planner 110, tank-based production equipment 120, one or more planning and execution systems 130, and computer 140 and made available to one or more associated users of tank-based production planner 110, tank-based production equipment 120, one or more planning and execution systems 130, and computer 140 using the cloud or in any other appropriate manner. Those skilled in the art will recognize that the complete structure and operation of network 150 and other components within multi-level tank-based production system 100 are not depicted or described. Embodiments may be employed in conjunction with known communications networks and other components.

Figure 2:
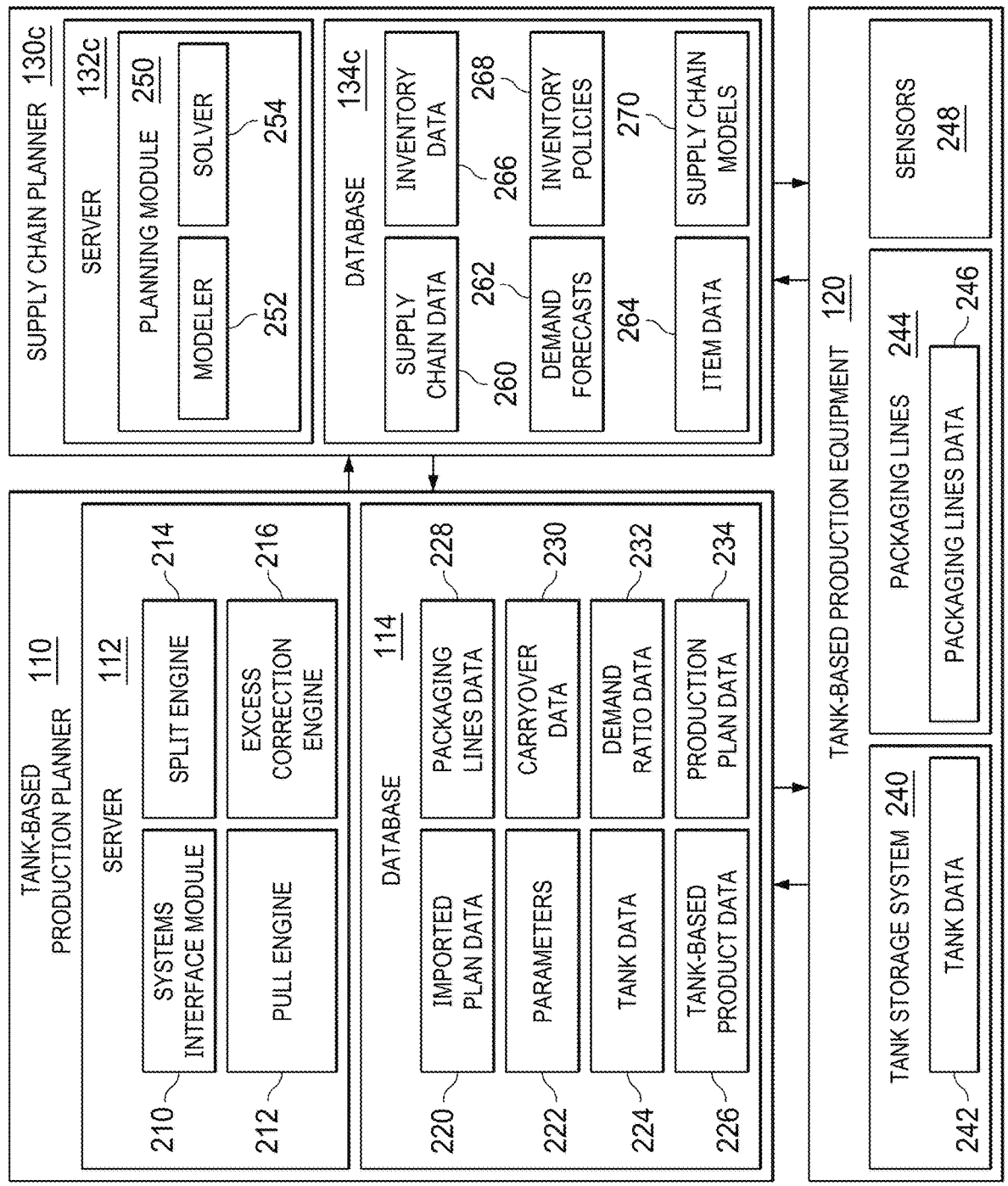
FIG. 2 illustrates the tank-based production planner, the tank-based production equipment, and the supply chain planner of FIG. 1 in greater detail, in accordance with an embodiment.

FIG. 2 illustrates tank-based production planner 110, tank-based production equipment 120, and supply chain planner 130c of FIG. 1 in greater detail, in accordance with an embodiment.

As discussed above, tank-based production planner 110 comprises server 112 and database 114. Although tank-based production planner 110 is shown as comprising a single server 112 and a single database 114, embodiments contemplate any number of servers 112 or databases 114 internal to, or externally coupled with, tank-based production planner 110. Server 112 of tank-based production planner 110 comprises systems interface module 210, pull engine 212, split engine 214, and excess correction engine 216. Although the server is shown and described as comprising a single systems interface module 210, a single pull engine 212, a single split engine 214, and a single excess correction engine 216, embodiments contemplate any suitable number or combination of these located at one or more locations local to, or remote from, tank-based production planner 110, such as on multiple servers or computers at one or more locations in the supply chain network.

Systems interface module 210 comprises an interface between tank-based production planner 110, tank-based production equipment 120, and one or more planning and execution systems 130, such as, for example supply chain planner 130c. Pull engine 212 consumes planned production orders from a current tank capacity. When pull engine 212 cannot consume any further planned production orders, split engine 214 assigns planned production orders to the remaining tank capacity without regard to lot-sizes, until one or more tanks 122 are empty. Excess correction engine 216 accounts for the amount of finished goods in excess of the lot-size by canceling an equivalent amount of planned production orders and replacing them with the accumulated excess product.

Database 114 of tank-based production planner 110 may comprise one or more databases or other data storage arrangement at one or more locations local to, or remote from, server 112. Database 114 of tank-based production planner 110 comprises imported plan data 220, parameters 222, tank data 224, tank-based product data 226, packaging lines data 228, carryover data 230, demand ratio data 232, and production plan data 234. Although database 114 of tank-based production planner 110 is shown and described as comprising imported plan data 220, parameters 222, tank data 224, tank-based product data 226, packaging lines data 228, carryover data 230, demand ratio data 232, and production plan data 234, embodiments contemplate any suitable number or combination of these, or other, types of data, located at one or more locations local to, or remote from, tank-based production planner 110 according to particular needs.

Imported plan data 220 may comprise a supply chain plan solved by supply chain planner 130c. According to embodiments, tank-based production planner 110 uses imported plan data 220 as the initial point to generate a new production plan. In one embodiment, parameters 222 provide customization of the method of automated plan correction. As described in further detail below, parameters 222 comprise user-selectable values to tailor tank-based production planner 110 to the characteristics of a particular tank-based product, production environment, and the like.

Tank data 224 comprises measurements, characteristics, specifications, and the like of one or more tanks 122 used for storage in multi-level production. Tank data 224 may comprise, for example, the total capacity of one or more tanks 122 and the amount of capacity currently utilized. Embodiments contemplate additional tank data 224 including, for example, measurements (volume, size, fittings for interconnections, etc.), the identity of one or more materials that can be stored or made in the tank, or the identity of one or more materials that cannot be stored or made in the tank (e.g., a particular allergenic food, materials incompatible with the lining or storage wall of one or more tanks 122, and the like). As described in further detail below, tank data 224 may comprise specifications such as, for example, a tank capacity for a semi-finished good and the amount of the tank capacity utilized by the semi-finished good at a particular time.

Tank-based product data 226 comprises measurements, characteristics, handling procedures, production procedures, recipes, and other data associated with tank-based materials. Tank-based product data 226 may include, for example, lot-size requirements for producing one or more finished goods using one or more packaging lines 124. Packaging lines data 228 comprises a current capacity or utilization of one or more packaging lines 124. The utilization of one or more packaging lines 124 may constrain production of the finished goods even when material is available in one or more tanks 122 for packaging. Embodiments contemplate packaging lines data 228 including data received from one or more sensors 248 monitoring the state of one or more packaging lines 124 such as, for example, packaging rate, fill-level, a current state of operation, or the like. Carryover data 230 of database 114 comprises the current amount of carryover production for a particular item or product. Demand ratio data 232 comprises the calculated allocation of the split of material to one or more finished goods, as described in further detail below. Production plan data 234 comprises a new production plan that is generated by tank-based production planner 110 to correct unfeasibility of the LP optimization solution of imported plan data 220.

Tank-based production equipment 120 comprises tank storage system 240 (including tank data 242), packaging lines system 244 (including packaging lines data 246), and one or more sensors 248. Tank storage system 240 controls, maintains, and monitors one or more tanks 122 and generates tank data 242. Tank data 242 comprises fill-level, capacity, stored material, production stage, concentration, freshness, or other like data received or calculated from one or more sensors 248 on one or more tanks 122. Packaging lines system 244 controls, maintains, and monitors one or more packaging lines 124 and generates packaging lines data 246. Packaging lines data 246 comprises fill-level, product type, item counts, state of operation, and other like data received or calculated from one or more sensors 248 on one or more packaging lines 124. As disclosed above, tank-based production equipment 120 may send tank data 242 and packaging lines data 246 to tank-based production planner 110 and supply chain planner 130c.

As discussed above, supply chain planner 130c comprises server 132c and database 134c. Although supply chain planner 130c is shown as comprising a single server 132c and a single database 134c, embodiments contemplate any suitable number of servers 132c or databases 134c internal to, or externally coupled with, supply chain planner 130c. Server 132c of supply chain planner 130c comprises planning module 250 having modeler 252 and solver 254. Although server 132c is shown and described as comprising a single planning module 250 having a single modeler 252 and a single solver 254, embodiments contemplate any suitable number or combination of planning modules 250, modelers 252, and solvers 254 located at one or more locations local to, or remote from, supply chain planner 130c, such as on multiple servers or computers at one or more locations in multi-level tank-based production system 100. Server 132c of supply chain planner 130c comprises planning module 250. Planning module 250 may comprise supply chain planning modeler 252 and supply chain planning solver 254. Although planning module 250 is shown and described as comprising a single modeler 252 and a single solver 254, embodiments contemplate any suitable number or combination of these located at one or more locations local to, or remote from, planning module 250, such as on multiple servers or computers at any location in the supply chain network.

Modeler 252 may model one or more supply chain planning problems of the supply chain entities. According to one embodiment, modeler 252 identifies resources, operations, buffers, and pathways, and maps the supply chain entities using supply chain entity models. For example, modeler 252 of server 132c models a supply chain planning problem that represents the supply chain network comprising multi-level tank-based production system 100 and formulates an LP optimization problem. According to embodiments, solver 254 of planning module 250 generates a solution to a supply chain planning problem. Supply chain solver 254 may comprise an LP optimization solver, a heuristic solver, a mixed-integer problem solver, a MAP solver, a Deep Tree solver, and the like. Although particular solvers 254 are described, embodiments contemplate any suitable solver 254 according to particular needs.

Database 134c of supply chain planner 130c may comprise one or more databases or other data storage arrangement at one or more locations, local to, or remote from, server 132c. Database 134c of supply chain planner 130c comprises supply chain data 260, demand forecasts 262, item data 264, inventory data 266, inventory policies 268, and supply chain models 270. Although database 134c of supply chain planner 130c is shown and described as comprising supply chain data 260, demand forecasts 264, item data 264, inventory data 266, inventory policies 268, and supply chain models 270, embodiments contemplate any suitable number or combination of data, located at one or more locations local to, or remote from, supply chain planner 130c, according to particular needs.

Supply chain data 260 comprises decision variables, business constraints, goals, and objectives of the one or more supply chain entities. According to some embodiments, supply chain data 260 may comprise formulations and models of supply chain planning problems, supply chain plans, and hierarchical objectives specified by, for example, business rules, master planning requirements, scheduling constraints, and discrete constraints. According to embodiments, supply chain data 260 includes sequence dependent setup times, lot-sizing, storage, shelf life, production, transportation, and procurement lead times, and the like.

Supply chain planner 130c calculates demand forecast 262 comprising the expected demand for one or more products. Supply chain planner 130c calculates demand forecast 262 based on, for example, past sales, past demand, mean daily demand (MDD), purchase data, promotions, events, or other like data received from the one or more supply chain entities. Demand forecasts 262 may cover a time interval such as, for example, by the minute, hour, daily, weekly, monthly, quarterly, yearly, or any suitable time interval, including substantially in real time. In addition, demand forecasts 262 are represented by any suitable combination of values and dimensions, aggregated or disaggregated, such as, for example, sales per week, sales per week per location, sales per day, sales per day per season, or the like, at any granularity of time, customer, item, region, or the like.

Supply chain planner 130c receives, stores, and maintains item data 264 for one or more finished goods, semi-finished goods, raw materials, and other suitable items. Item data 264 may comprise for example, an item identifier (such as a Stock Keeping Unit (SKU), Universal Product Code (UPC) or the like), and one or more attributes and attribute values associated with an item identifier. Item data 264 may comprise data about one or more items organized and sortable by, for example, attributes, attribute values, identifiers, sales volume, demand forecast, or any stored category or dimension.

Supply chain planner 130c receives inventory data 266 from inventory system 130b. As disclosed above, inventory data 266 may comprise item identifiers, pricing data, attribute data, inventory levels, and other like data about materials, items, products, and the like, at one or more locations in the supply chain network.

Inventory policies 268 may comprise any suitable inventory policy describing the reorder point and target quantity, or other inventory policy parameters that set rules for one or more planning and execution systems 130 to manage and reorder inventory. Inventory policies 268 may be based on target service level, demand, cost, fill rate, or the like. According to an embodiment, inventory policies 268 comprise target service levels that ensure that a service level of the one or more supply chain entities is met with a certain probability. Other types of service levels associated with inventory quantity or order quantity may comprise, but are not limited to, a maximum expected backlog and a fulfillment level. Once the service level is set, supply chain planner 130c may determine a replenishment order according to one or more replenishment rules, which, among other things, indicates to the one or more supply chain entities to determine or receive inventory to replace the depleted inventory.

Supply chain models 270 represent the flow of materials through the one or more supply chain entities of the supply chain network. Modeler 252 of supply chain planner 130c may model the flow of materials through the one or more supply chain entities of the supply chain network as one or more material storage and/or transition units modeled as nodes, which may be referred to as, for example, buffer nodes, buffers, or nodes. Each node may represent a buffer for an item (such as, for example, a raw material, intermediate good, finished good, component, and the like), resource, or operation (including, for example, a production operation, assembly operation, transportation operation, and the like). Various transportation or manufacturing processes are modeled as arcs connecting the nodes. Each arc may represent the flow, transportation, or assembly of materials (such as items or resources) between the nodes by, for example, production processing or transportation. A planning horizon for supply chain models 270 may be broken down into elementary time-units, such as, for example, time-buckets, or, simply, buckets.

As described in further detail below, tank-based production planner 110 improves the production of tank-stored beverages in multi-level tank-based production using flexible-capacity method 300 or a constrained capacity method 400. For flexible-capacity method 300, tank-based production planner 110 checks the capacity of one or more tanks 122 when generating the new production plan but does not check the capacity of one or more packaging lines 124. For capacity-constrained method 400, tank-based production planner 110 checks the capacity of both one or more tanks 122 as well as one or more packaging lines 124 when generating the new production plan.

Figure 3:
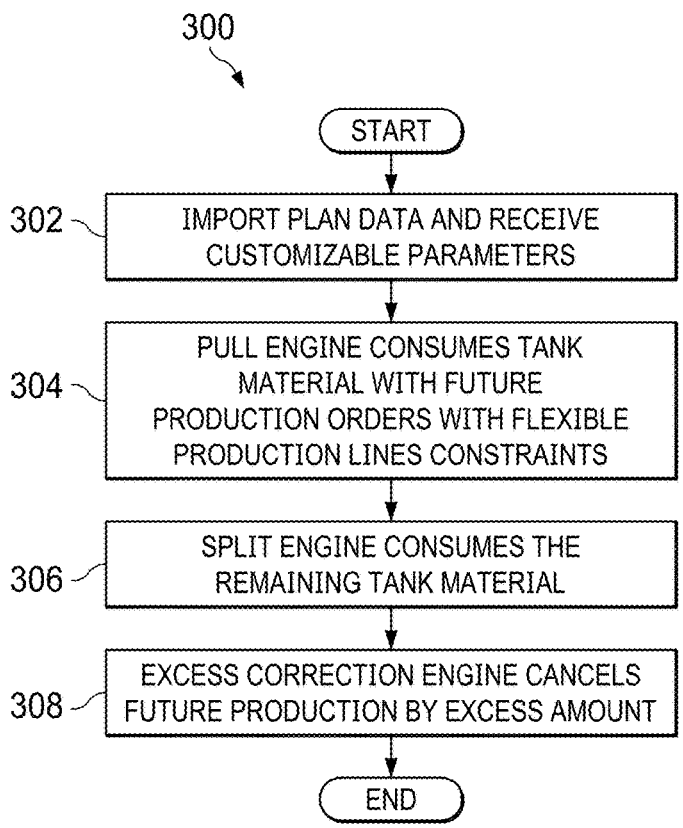
FIG. 3 illustrates a method of automated plan correction for multi-level tank-based production, in accordance with an embodiment having flexible-capacity constraints.

FIG. 3 illustrates method 300 of automated plan correction for multi-level tank-based production, in accordance with an embodiment having flexible-capacity constraints. Method 300 proceeds by one or more activities, which, although described in a particular order may be performed in one or more permutations, according to particular needs.

For method 300 of automated plan correction for multi-level tank-based production having flexible-capacity constraints (flexible-capacity method 300), tank-based production planner 110 determines the volume of packaged orders at future periods without consideration of the capacity constraints of one or more packaging lines 124, which maintains the demand satisfaction from the LP optimization solve generated by supply chain planner 130c.

At activity 302, systems interface module 210 imports plan data from supply chain planner 130c and receives one or more parameters 222. According to embodiments, imported plan data 220 is an LP optimization plan solved by supply chain planner 130c. Tank-based production planner 110 uses imported plan data 220 as the initial point to generate a new production plan. In one embodiment, systems interface module 210 extracts information from the LP optimization plan after a multi-sweep lot-sizing process. As disclosed above, systems interface module 210 receives values for one or more user-configurable parameters 222. Embodiments contemplate default values for the one or more parameters 222, which may be automatically selected based on the particular product that is being planned. By way of example only and not by way of limitation, parameters 222 may include:

a counter, n, that indicates the quantity of time buckets for emptying the tank (such as, for example, a value of one for weekly time buckets would indicate tank-based production planner 110 should generate a plan that empties one or more tanks 122 every week);

a quantity, f, of look-ahead time buckets for pulling planned production orders to the current time bucket (such as, for example, a value of f equal to ten will pull planned product orders up to ten weeks from the current week);

a starting time bucket, s, (such as, for example, a value that identifies the week by its ordinal place in the calendar (e.g. the first week of a year is indicated by a value of "1"; the second week indicated by "2", etc.)); and a total quantity, e, of time buckets for a tank-based production planning period (such as, for example, a quantity of weeks to correct plans until the planning process is rerun).

Although systems interface module 210 is described as receiving particular parameters 222 defining a particular quantity of weeks or a week number, embodiments contemplate tank-based production planner 110 receiving, storing, or using other suitable parameters 222 expressing any suitable time or time period (including, for example, a start time, a start date, an end time, an end date, a particular quantity of actions or cycles performed by tank-based production equipment 120, a length of a time period, and the like) which may be expressed in other suitable units of time (such as, for example, seconds, minutes, hours, days, weeks, months, or the like), according to particular needs.

At activity 304, pull engine 212 consumes tank material having planned production orders without considering constraints of one or more production lines 214. According to embodiments, pull engine 212 assigns the remaining amount of material in one or more tanks 122 to consume planned production orders of one or more finished goods until the remaining amount of material in one or more tanks 122 is less than a predetermined value.

Pull engine 212 determines that a planned production order may be produced when the remaining quantity of material in one or more tanks 122 is greater than or equal to the material required for that planned production order. The remaining amount of material in one or more tanks 122 in a particular week is the total capacity of one or more tanks 122 less the total material packed out of the tank. According to embodiments, pull engine 212 calculates pull engine 212 start week, according to Equation 1:

$$Plsw = \text{Max}(S, L) \qquad (1)$$

wherein, pull engine 212 start week (Plsw) is the maximum of the starting time(S) and the lead time from the start of production until the semi-finished good is ready in the tank (L). Pull engine 212 may then consume planned production orders ($P_{kmN}$) using the amount of material of the semi-finished good (SFG) remaining in one or more tanks 122 ($R_{Kn}$) according to the process represented by the following logic:

```
While N ≤ E + Pl_sw:
    For every SFG k = 1, 2, ..., MaxK:
        For every FG m= 1, 2, ..., MaxT
            If R_Kn ≥ P_kmN
                Update PD
                    R_Kn = R_Kn - P_kmN
            Else Move to Next FGkm+1
        End for Loop-3
``` wherein, when the time period for emptying the tank (N) is less than or equal to the total time period (E) plus pull engine 212 start week (Plsw), pull engine 212 consumes the remaining material in the one or more tanks for each Kth semi-finished good (SFG), one through max K and each Mth finished good (FG), one through max T. Pull engine 212 calculates the remaining amount of material of the Kth SFG in the one or more tanks at the Nth week ($R_{Kn}$) as the difference of the tank capacity for the Kth SFG ($T_K$) less the tank capacity used for the Kth SFG at the Nth week ($U_{Kn}$). When the remaining amount of the Kth SFG material in the one or more tanks at the Nth week ($R_{Kn}$) is greater than or equal to the production of the Mth FG at the Nth week from the Kth SFG ($P_{Kmn}$) (i.e. the planned production orders), pull engine 212 updates the production date (PD) for the planned production order, followed by updating the amount of material of the semi-finished good (SFG) remaining in the one or more tanks ($R_{Kn}$) by subtracting the production of the Mth FG at the Nth week from the Kth SFG ($P_{Kmn}$). When the amount of material of the semi-finished good (SFG) remaining in the one or more tanks ($R_{Kn}$) is less than the production of the Mth FG at the Nth week from the Kth SFG ($P_{Kmn}$), split engine 214 continues to the next lot size of the Mth FG packed from the kth SFG ($FG_{Km}$).

At activity 306, split engine 214 consumes the remaining tank material by splitting the remaining material among the production of the finished goods. According to embodiments, split engine 214 consumes the remaining amount of material of the Kth SFG in one or more tanks 122 at the Nth week ($R_{Kn}$) by sharing ($R_{Kn}$) to each finished good (FG) with non-zero production during the current time bucket (i.e. the production of the Mth FG at the Nth week from the Kth SFG ($P_{Kmn}$)), which is the process represented by the following logic:

```
Splt_m = MDDmk/ Σ (MDDmk * Pkm)
(where Pkm =1 if Pkmn > 0, else Pkm= 0)
If R_Kn > 0, Pkmn = Pkmn + Splt_m * R_Kn
    End for Loop-2
Update N= N+1
E_kmN = EkmN_-1 + Splt_m * R_Kn
End While
```

The remaining amount of material of the Kth SFG in one or more tanks 122 at the Nth week ($R_{Kn}$) is apportioned to the already produced finished goods in proportion to each finished goods' mean daily demand (MDD). According to embodiments, the percentage of the split assigned to the Mth finished good ($Splt_m$) is equal to the MDD for the Mth finished good and the kth SFG (MDDmk) divided by the sum of the MDDmk for all finished goods and SFGs having a non-zero production of the Mth FG at the Nth week from the Kth SFG ($P_{Kmn}$). Split engine 214 then updates the production of the Mth FG at the Nth week from the Kth SFG ($P_{Kmn}$) according to Equation 2:

$$Pkmn = Pkmn + Splt_m * R_{Kn}, \qquad (2)$$

$$\text{for } R_{Kn} > 0$$

wherein the production of the Mth FG at the Nth week from Kth SFG ($P_{Kmn}$) is updated by adding to the production of the Mth FG at the Nth week from the Kth SFG ($P_{Kmn}$) the multiplicative product of the percentage of the split assigned to the Mth finished good ($Splt_m$) and the remaining amount of material of the Kth SFG in one or more tanks 122 at the Nth week ($R_{Kn}$), which may be referred to as a split allocation ($Splt_m * R_{Kn}$).

Split engine 214 moves to the next week by updating a counter, N, to N+1, and updating the excess amount ($E_{kmN}$) for each product. According to an embodiment, the excess amount ($E_{kmN}$) is calculated according to Equation 3:

$$E_{kmN} = EkmN_{-1} + Splt_m * R_{Kn} \qquad (3)$$

wherein the excess amount ($E_{kmN}$) is added to the split allocation ($Splt_m * R_{Kn}$).

At activity 308, excess correction engine 216 accounts for the excess amount by cancelling future production. To prevent overproduction of any items, excess correction engine 216 corrects the excess amount produced by split engine 214 by canceling future production, when the excess amount accumulated over more than one time period is greater than or equal to at least one of the planned production orders. Excess correction engine 216 accounts for the excess amount using a process that is represented by the following logic:

```
If E_kmN ≥ P_kmZ
Update E_kmN=E_kmN - P_kmZ
Update P_kmZ = 0
```

Excess correction engine 216 checks whether the excess amount ($E_{kmN}$) is greater or equal to the production of the Mth FG from the Kth SFG at any time bucket Z ($P_{KmZ}$), wherein Z is each bucket from (N+1) through (E)+(Plsw). When the production of the Mth FG from the Kth SFG at any time bucket Z ($P_{KmZ}$) is greater than or equal to the excess amount ($E_{kmN}$), excess correction engine 216 updates the excess amount ($E_{kmN}$) to the difference of the excess amount ($E_{kmN}$) minus the production of the Mth FG from the Kth SFG at any time bucket Z ($P_{KmZ}$). After updating the production of the Mth FG from the Kth SFG at any time bucket Z ($P_{KmZ}$) to zero, the method ends.

Figure 4:
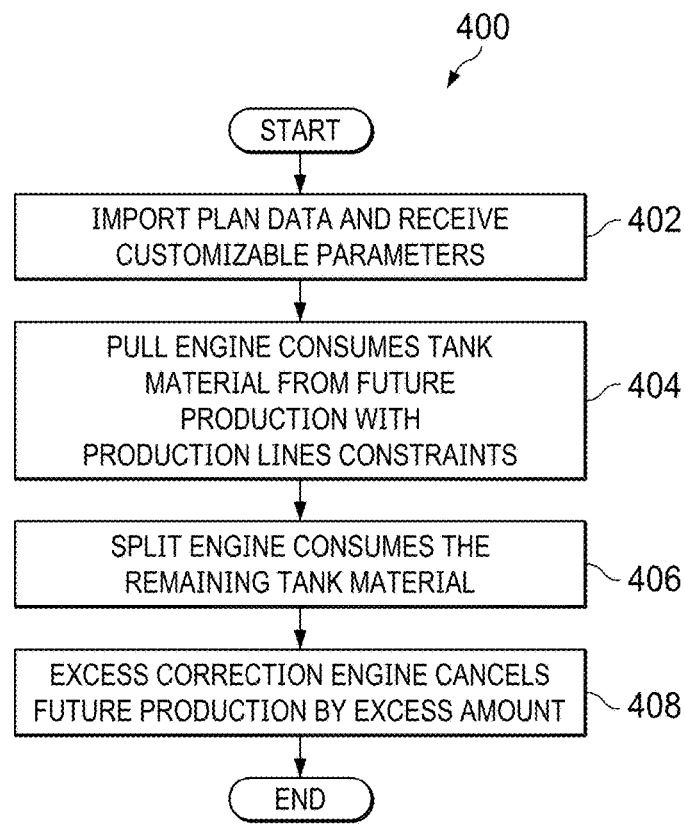
FIG. 4 illustrates a method of automated plan correction for multi-level tank-based production, in accordance with an embodiment having constrained capacity.

FIG. 4 illustrates method 400 of automated plan correction for multi-level tank-based production, in accordance with an embodiment having constrained capacity. Method 400 proceeds by one or more activities, which, although described in a particular order may be performed in one or more permutations, according to particular needs.

For method 400 of automated plan correction for multi-level tank-based production having constrained-capacity constraints (constrained-capacity method 400), tank-based production planner 110 determines the volume of packaged orders at future periods while respecting the capacity constraints of packaging lines 124.

First activity 402 of constrained-capacity correction method 400 proceeds similarly to flexible-capacity correction method 300, wherein systems interface module 210 receives imported plan data 220 from supply chain planner 130c and receives one or more parameters 222. Second activity 404 of constrained-capacity correction method 400 however proceeds in a different manner than second activity 304 of flexible-constraint correction method 300.

At activity 404, pull engine 212 consumes tank material with planned production orders while checking capacity of one or more packaging lines 124. According to embodiments, pull engine 212 assigns the remaining amount of material in one or more tanks 122 to consume planned production orders of one or more finished goods until the remaining amount of material in one or more tanks 122 is less than the planned production order AND the available capacity of one or more packaging lines 124 is greater than or equal to the capacity required for the planned production order. According to embodiments, pull engine 212 calculates pull engine 212 start week (Plsw) according to Equation 1, above. Pull engine 212 may then consume planned production orders ($P_{kmN}$), according to the process represented by the following logic:

```
While N <= E + Plsw
    For every SFG k = 1, 2, ..., MaxK:
        For every FG m= 1, 2, ..., MaxT
            If R_Kn +Δ_n >= P_kmN and P_kmN < AVC_N * production rate(m)
                Update PD = N
                R_Kn = R_Kn - P_kmN
                                Else Move to Next FGkm+1
        End for Loop-3
            P = 1 if Pkmn >0
```

Pull engine 212 calculates the remaining amount of material of the Kth SFG in one or more tanks 122 at the Nth week ($R_{Kn}$), as disclosed above. When the time period for emptying tank (N) is less than or equal to the sum of the total time period (E) added to pull engine 212 start week (Plsw), pull engine 212 consumes the remaining material in one or more tanks 122 for each Kth semi-finished good (SFG), one through max K, and each Mth finished good (FG), one through max T. A term ($\Delta_{Kn}$) represents the carryover of the SFG based on capacity unavailability at a previous bucket.

When both: (1) the remaining amount of material of the Kth SFG in the one or more tanks at the Nth week ($R_{Kn}$) added to any carryover amount of material of the kth SFG in the Nth bucket ($\Delta_{Kn}$) is greater than or equal to the production of the Mth FG at the Nth week from the Kth SFG ($P_{Kmn}$), and (2), the production of the Mth FG at the Nth week from the Kth SFG ($P_{Kmn}$) is less than the available capacity of one or more packaging lines 124 after a first run in the Nth bucket ($AVC_N$), pull engine 212 updates the production date (PD) for the planned production order, followed by updating the amount of material of the semi-finished good (SFG) remaining in one or more tanks 122 ($R_{Kn}$) by subtracting the production of the Mth FG at the Nth week from the Kth SFG ($P_{Kmn}$). Otherwise, pull engine 212 continues to the next lot size of the Mth finished good FG packed from the kth SFG ($FG_{Km}$).

At activity 406, split engine 214 consumes the remaining tank material by splitting the remaining material among the production of the finished goods. The process used by split engine 214 to consume the remaining tank material differs from activity 306 of flexible-capacity correction method 300 in that split engine 214 of constrained-capacity correction method 400 takes into account the carryover amount ($\Delta_{Kn}$) and the available capacity of one or more packaging lines 124 ($AVC_N$) as well as the production rate of a lot size of the Mth finished good FG packed from the kth SFG ($FG_{Km}$) with one available capacity (production rate (m)).

```
Splt_m = MDDmk/ Σ (MDDmk * Pkm)
    (where Pkm =1 if Pkmn > 0, else Pkm= 0)
    If R_Kn > 0 and Splt_m * R_Kn > AVC_N * production rate(m)
    Pkmn = Pkmn + Splt_m * R_Kn
        End for Loop-2
R_Kn = Δ_kN+1
Update N= N+1
E_kmN = EkmN_-1 + Splt_m * R_Kn
End While
```

According to embodiments, the remaining amount ($R_{Kn}$) is apportioned to each finished good (FG) with non-zero production during the current time bucket (i.e. the production of the Mth FG at the Nth week from the Kth SFG ($P_{Kmn}$)) based on the percentage of the split assigned to the Mth finished good (Spltm), as disclosed above. Split engine 214 updates the production of the Mth FG at the Nth week from the Kth SFG ($P_{Kmn}$), according to Equation 4:

$$Pkmn = Pkmn + Splt_m * R_{Kn} \qquad (4)$$

for $R_{Kn} > 0$; and $(Splt_m * R_{Kn}) > (AVC_N * \text{production rate}(m))$, wherein the production of the Mth FG at the Nth week from the Kth SFG ($P_{Kmn}$) is updated by adding the split allocation ($Splt_m * R_{Kn}$). When the split allocation ($Splt_m * R_{Kn}$) is greater than the available capacity of one or more packaging lines 124 ($AVC_N$) multiplied by the production rate to produce $FG_{Km}$ with 1 available capacity (production rate (m)) and the remaining amount ($R_{Kn}$) is non-zero. Split engine 214 moves to the next week by updating a counter, N, to N+1, updating the remaining amount ($R_{Kn}$) by setting it equal to the carryover amount of the time bucket N+1 ($\Delta_{kN+1}$), and updating the excess amount ($E_{kmN}$).

According to an embodiment, the excess amount ($E_{kmN}$) is calculated according to Equation 5:

$$E_{kmN} = E_{kmN-1} + Splt_m * R_{Kn} \quad (5)$$

wherein the excess amount ($E_{kmN}$) is increased by the split allocation ($Splt_m * R_{Kn}$).

At activity 408, excess correction engine 216 accounts for the excess amount by cancelling future production, as described above. After correcting for the excess amount, constrained-capacity correction method 400 ends.

Figure 5:
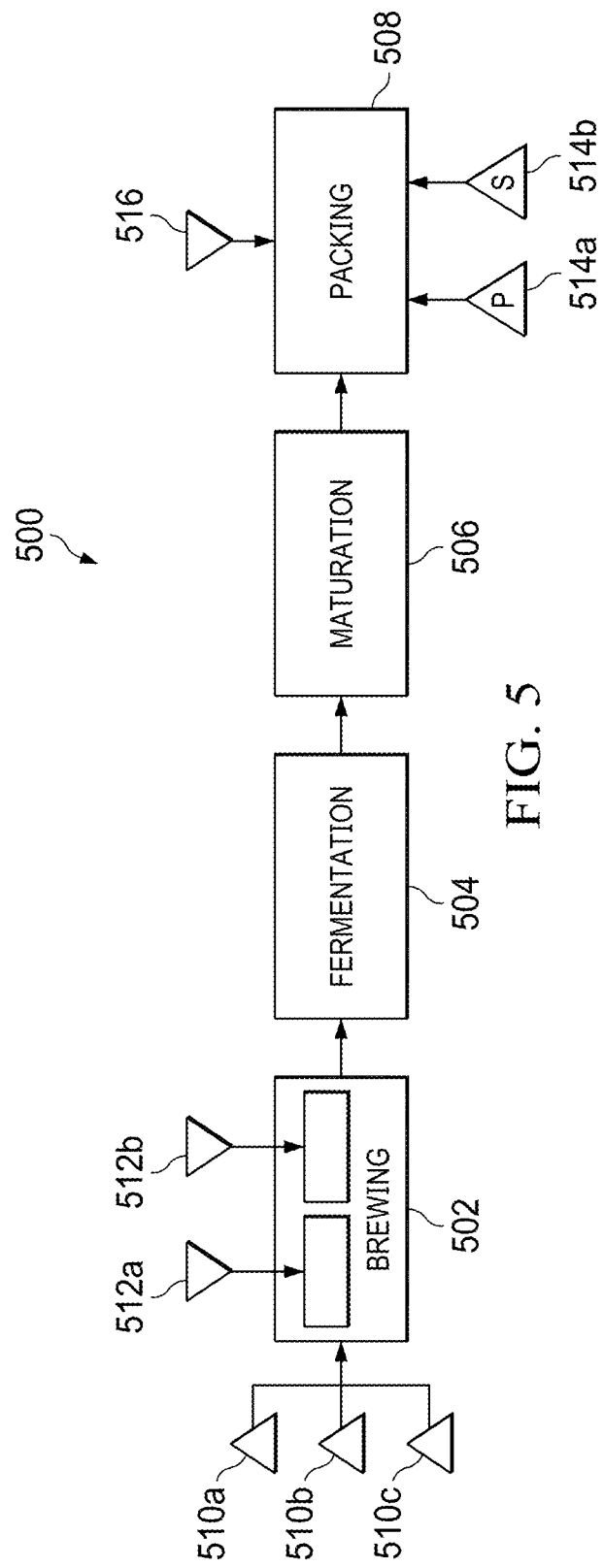
FIG. 5 illustrates a simplified beer manufacturing process, in accordance with an embodiment.

FIG. 5 illustrates simplified beer manufacturing process 500, in accordance with an embodiment. Simplified beer manufacturing process 500 proceeds by one or more activities, which, although described in a particular order may be performed in one or more permutations, according to particular needs.

Simplified beer manufacturing process 500 comprises four stages: brewing 502, fermentation 504, maturation 506, and packing 508. The first three stages (brewing 502, fermentation 504, and maturation 506) are executed within one or more tanks 122. The final stage (packing 508) transfers the contents of one or more tanks 122 into packages of products 126. Although simplified beer manufacturing process 500 is shown and described as comprising four particular stages, embodiments contemplate other brewing processes for beer or other beverages comprising any number of these, or other, stages, according to particular needs.

Beginning at brewing stage 502, raw material 510, such as, for example, water, yeast, hops, grains, and/or other ingredients are added to one or more tanks 122 and mixed together. In the exemplary brewing activity illustrated above, three raw materials 510a-510c are mixed in at least one of two tanks 512a-512b. In this example, first tank 512a may be used for brewing a premium beer or a general beer, while second tank 512b is only used for general beer. In addition, the premium beer may be brewed up to twenty brews per week, whereas the general beer is brewed up to one-hundred-and-twenty brews per week.

Beer remains in the same at least one of two tanks 512a-512b for the following two stages, fermentation 504 and maturation 506. At the final stage, packing 508, one or more packaging lines 124 transfer the beer from the at least one of two tanks 512a-512b to at least two different types of packaging 514a-514b using capacity 516, each of the different packagings 514a-514b represent a different finished good.

By way of example only and not by way of limitation, tank-based production planner 110 may utilize flexible-capacity correction method 300 of FIG. 3 to plan the production of the manufactured beer, as shown by the following examples. Continuing with this example, systems interface module 210 receives imported plan data 220 from supply chain planner 130c comprising the solution to a supply chain planning problem comprising the manufactured beer. The supply chain planning problem comprises a mathematical model of the supply chain network, including the tank-based production of this example's manufactured beer, "Matured Beer." Supply chain planner 130c performs an LP optimization and multi-sweep lot-sizing solve of the supply chain planning problem, and systems interface module 210 extracts the production plan from the solution. An exemplary brewing plan extracted from the plan data is illustrated by TABLE 1.

TABLE 1

|  | Tank-1 Week-1 | Week-2 | Week-3 | Tank-2 Week-4 | Week-5 | Tank-3 Week-6 |
|---|---|---|---|---|---|---|
| Matured Beer | 4500 | | | 4500 | | 4500 |

The brewing plan of TABLE 1 indicates that the beverage manufacturer should brew three batches of beer at three different weeks, each time producing the same quantity of beer, 4500 hectoliters (hL), which is the capacity of the three tanks in this example (Tank-1, Tank-2, and Tank-3). Referring to the demand plan and the production plan, however, the brewing plan from supply chain planner 130c requires unbottled beer to remain in a tank for several weeks before bottling, which could cause the beer to spoil.

TABLE 2

| Min. Lot-Size | ID | Week-1 | Week-2 | Week-3 | Week-4 | Week-5 | Week-6 |
|---|---|---|---|---|---|---|---|
| 1000 | FG1 | 2000 | | | 1000 | | 2000 |
| 1000 | FG2 | | | | 1000 | | 1000 |
| 1000 | FG3 | | | | | 1000 | |
| 1000 | FG4 | | 1000 | | 1000 | | 1000 |
| 1000 | FG5 | | 1000 | | 1000 | | |

TABLE 2 shows the demand plan for five exemplary finished goods (FG1-FG5), each of which is a different packaging of the matured beer produced by the brewing plan of TABLE 1. The demand plan may then be used to calculated a production plan.

TABLE 3

| Min Lot-Size | ID | Week-1 | Week-2 | Week-3 | Week-4 | Week-5 | Week-6 |
|---|---|---|---|---|---|---|---|
| 1000 | FG1 | 2000 | | | 1000 | | 2000 |
| 1000 | FG2 | | | | 1000 | | 1000 |
| 1000 | FG3 | | 1000 | | | 1000 | |
| 1000 | FG4 | | 1000 | | 1000 | | 1000 |
| 1000 | FG5 | | | | 1000 | | |

TABLE 3 illustrates the production plan for the five exemplary finished goods (FG1-FG5). The production plan is the amount of packaged beer needed to meet the demand indicated in the demand plan of TABLE 2. In this example, the material in Tank-1 is consumed in 4 weeks: 2000 hL to produce FG1 in week-1; 2000 hL to produce FG3 in week 2; and finally 500 hL to produce FG4 in week-4. Unfortunately, Tank-1 cannot be refilled until the demand in Week-4 is satisfied, which means that Tank-1 will be underutilized for at least four weeks. In addition, the production plan indicates that FG4 is produced from two different beer lots, Tank-1 and Tank-2, which are produced four weeks apart.

Continuing with this example scenario of TABLES 1-3, tank-based production planner 110 generates a new production plan from the planning data of TABLES 1-3 using flexible-capacity correction method 300. As disclosed above, in addition to the planning data received from supply chain planner 130c, systems interface module 210 receives one or more configurable parameters 222. Continuing with the example of the simplified beer manufacturing process, systems interface module 210 receives the following three parameters:

$N_k$=1, indicating tank-based production planner 110 searches for a production that empties the tank in one week;

$P_x=18$, indicating tank-based production planner 110 may pull plan orders as far as 18 weeks in the future; and
$S_k=18$, indicating that tank-based production planner 110 applies flexible-capacity correction method 300 to data for the following 18 weeks.

Based on the received planning data and parameters, pull engine 212 may then pull planned production orders ($P_{kmN}$) using the amount of beer remaining ($R_{Kn}$) in each of the three tanks of this example. According to an embodiment, pull engine 212 consumes future orders from the tanks in the same week that the beer has matured, which is when the beer is ready for bottling.

TABLE 4

|  | Week-1 | Week-2 | Week-3 | Week-4 | Week-5 | Week-6 |
|---|---|---|---|---|---|---|
| 000259 (Matured Beer) | 4500 |  |  | 9000 |  |  |

TABLE 4 illustrates the brewing plan after pulling.

TABLE 5

| Min Lot-Size |  | Week-1 | Week-2 | Week-3 | Week-4 | Week-5 | Week-6 |
|---|---|---|---|---|---|---|---|
| 1000 | FG1 | 2000 |  |  | 3000 |  |  |
| 1000 | FG2 |  |  |  | 2000 |  |  |
| 1000 | FG3 | 1000 |  |  | 1000 |  |  |
| 1000 | FG4 | 1000 |  |  | 2000 |  |  |
| 1000 | FG5 |  |  |  | 1000 |  |  |

TABLE 5 illustrates the planned production orders after pulling.

After calculation using method 300, pull engine 212 moves the production of FG3 and FG4 from Week-2 & Week-3 to Week-1. In addition, pull engine 212 moves the tank Capacity of Week-6 to Week-4 to cover the manufacturing requirements of 5000 hL in that week. Although there are 500 hL remaining in Tank 1 at the end of Week-1, the hard batch size constraints of 1000 hL prevent pull engine 212 from pulling the production of the 500 hL of FG5 to Week-1.

As disclosed above, at activity 406 of constrained-capacity correction method 400, split engine 214 consumes the remaining material by distributing the material among the production of the different finished goods. Here, split engine 214 allocates the additional 500 hL of beer remaining in Tank-1 to each of the finished goods according to the ratio of the mean weekly demand (MWD). (FG1-FG5).

TABLE 6

| ITEMS | MWD | Allocations |
|---|---|---|
| FG1 | 2250 | 250 |
| FG2 |  |  |
| FG3 | 1125 | 125 |
| FG4 | 1125 | 125 |
| FG5 |  |  |
|  | Total | 500 |

TABLE 6 shows the splitting engine allocations of finished goods based on the ratio of MWD over the entire planning horizon (i.e. 18 weeks). MWD is used to calculate the split percentage ($Splt_m$) of the allocation of the remaining material according to the following Equation 6:

$$Splt_m = MWD_{mk} / \sum (MWD_{mk} * P_{km}) \quad (6)$$

wherein $P_{km}=1$ when $P_{kmn}>0$, and otherwise $P_{km}=0$. Using Equation 6, the split percentages ($Splt_m$) are:
FG1: 2250/(2250+1125+1125)=50%;
FG2=0 (because FG2 has no planned production in the current planning week, i.e. the ($P_{kmn}$) of FG2=0);
FG3=1125/(2250+1125+1125)=25%;
FG4 is 1125/(2250+1125+1125)=25%; and
FG5=0 (($P_{kmn}$) of FG5=0).

The split percentages ($Splt_m$) are used to calculate the split allocation ($Splt_m * R_{Kn}$), which is added to the current planned production to generate the new planned production according to Equation 2, as disclosed above, and as reproduced below for convenience:

$$P_{kmn} = P_{kmn} + Splt_m * R_{Kn} \quad (2)$$

wherein, $R_{Kn}>0$. According to Equation 2, the split allocation of FG1 is 50%*500 hL=250 hL; FG2 and FG3 are 25%*500 hL=125 hL. The split allocation is then added to the current planned production to generate the new planned production: FG1 is 2000+250=2250; FG2 and FG3 are 1000+125=1125.

TABLE 7

|  | Week-1 | Week-2 | Week-3 | Week-4 | Week-5 | Week-6 |
|---|---|---|---|---|---|---|
| 000259 (Matured Beer) | 4500 |  |  | 9000 |  |  |

TABLE 7 shows the brewing plan of for the exemplary matured beer after pulling and splitting. As described above, the result of the pulling and splitting of the plan data includes the capacity of Tank-3 moved from Week-6 to Week-4.

TABLE 8

| Average Demand | ID | Week-1 | Week-2 | Week-3 | Week-4 | Week-5 | Week-6 |
|---|---|---|---|---|---|---|---|
| 2000 | FG1 | 2250 |  |  | 3000 |  |  |
| 1000 | FG2 |  |  |  | 2000 |  |  |
| 1000 | FG3 | 1125 |  |  | 1000 |  |  |
| 1000 | FG4 | 1125 |  |  | 2000 |  |  |
|  | FG5 |  |  |  | 1000 |  |  |

TABLE 8 shows the planned production orders after pulling and splitting. The planned production orders of FG1, FG3, and FG4 are modified to include the split allocation. In addition, tank-based production planner 110 moves the planned production orders of Week-5 and Week-6 to Week-4.

TABLE 9

|  | Week-1 | Week-2 | Week-3 | Week-4 | Week-5 | Week-6 |
|---|---|---|---|---|---|---|
| FG1 | 2000 |  |  | 1000 |  | 2000 |
| FG2 |  |  |  | 1000 |  | 1000 |
| FG3 |  | 1000 |  |  | 1000 |  |
| FG4 |  | 1000 |  | 1000 |  | 1000 |
| FG5 |  |  |  | 1000 |  |  |

TABLE 9 shows the demand plan after pulling and splitting.

Excess correction engine 216 checks whether any excess amount ($E_{kmN}$) is greater than or equal to the planned production at any time bucket ($P_{KmZ}$) between N+1 and the last time bucket of the planning horizon (E+Plsw). Continuing with the example of the simplified beer manufacturing process, the updated production plan generates an excess amount of the finished good (beer) at the previous activity. Excess correction engine 216 stores the excess amount until the sum of the excess amount generated during subsequent plans is enough to satisfy a planned production order. When the excess amount is greater than or equal the planned production order, excess correction engine 216 cancels the planned production order.

TABLE 10

|  | Week-5 | Week-6 | Week-7 | Week-8 | Week-9 | Week-10 | Week-11 |
|---|---|---|---|---|---|---|---|
| Excess Production | 1000 | | | | | | |
| Produced Quantity | 3000 | 4000 | 5000 | 2000 | 1000 | 4000 | 2000 |

TABLE 10 shows the excess production and produced quantity for an exemplary seven-week period from Week-5 to Week-11 of the exemplary beer manufacturing process of FIG. 5. By comparing TABLE 8 with TABLE 9, the excess amounts of production are calculated by the difference. 1000 hL are over-produced in Week-5. Excess correction engine 216 finds the earliest planned production order that is the same size as the excess amount. The planned production order in Week-9 is 1000 hL, which is the same as the excess amount of Week-5. Excess correction engine 216 cancels the planned production order of Week-9. By cancelling out any future planned production that can be met by the excess amounts that are over-produced in earlier time-buckets, the tank-based production planning does not overproduce any of the finished goods.

Result Comparison

As described in further detail below, flexible-capacity correction method 300 of FIG. 3 improves manufacturing of tank-stored beverages over a plan generated using only LP optimization. The following tables, TABLES 11 and 12, show weekly production volume and carryover for two plants of a large beverage manufacturer that produced beer using flexible-capacity correction method 300 and compares these results with the weekly production volume and carryover obtained using LP optimization (LPOPT).

TABLE 11

| Production Volume using: | Week-1 | Week-2 | Week-3 | Week-4 | Week-5 | Week-6 |
|---|---|---|---|---|---|---|
| Flexible-Capacity Correction Method | 1206139 | 1333942 | 1435210 | 1662404 | 1420906 | 1413595 |
| LPOPT | 1296808 | 1312856 | 1378060 | 1366891 | 1273525 | 1421422 |

TABLE 11 compares the production volume for the beverage manufacturer over a six-week period using LPOPT and flexible-capacity correction method 300. For a six-week period in 2019, tank-based production equipment 120 produced the production volume shown using flexible-capacity correction method 300. The production volume of flexible-capacity correction method 300 was compared with the production volume that would have been produced using the plan generated by the LPOPT method. As a result of using flexible-capacity correction method 300, the weekly variation of production volume fell to less than 5%. This stands in contrast to the weekly variation of production volume using LPOPT. LPOPT weekly variation of production volume ranges from less than 1% (Week-3 to Week-4) to over 11% (Week-5 to Week-6).

An additional benefit of using flexible-capacity correction method 300 is the reduction of the amount of the product remaining in tanks after packaging all products 126 for that time bucket. As shown by the following example, flexible-capacity correction method 300 reduces (and, in many cases, eliminates) the amount of liquid remaining in one or more tanks 122 after packaging all orders of one or more products 126 in that time bucket. When the liquid in one or more tanks 122 is not completely used during a packaging operation in one bucket, the liquid will be wasted or used to package the product orders in a subsequent time bucket.

TABLE 12

| Percentage of Carryover using: | Week-1 | Week-2 | Week-3 | Week-4 | Week-5 | Week-6 | Week-7 |
|---|---|---|---|---|---|---|---|
| Flexible-Capacity Correction Method | 0 | 0 | 0 | 0 | 0 | 0 | 0 |
| LPOPT | 15 | 12 | 10 | 15 | 20 | 16 | 18 |

TABLE 12 compares the percentage of beer that is bottled from one or more tanks 122 used in previous weeks. Using flexible-capacity correction method 300, the carryover rate fell to zero percent for all seven weeks of the tested period. In contrast, using LPOPT, the carryover rate ranged from no less than 10% to as high as 20%. These results indicate that flexible-capacity correction method 300 reduces the time that beer is stored in one or more tanks 122 after it is produced. In addition, method 300 also reduces the quantity of one or more tanks 122 needed to satisfy a given production volume while maintaining one or more business objectives.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A multi-level tank-based production system, comprising:
    one or more sensors affixed to one or more devices associated with one or more tanks of a tank storage system and with one or more packaging lines of a packaging lines system, and a computer, comprising a processor and memory, the computer configured to:
        receive from the one or more sensors monitoring the one or more packaging lines, packaging line data comprising one or more of: fill-level, product type, item counts and state of operation, wherein the packaging line data is calculated from the one or more sensors;
        identify, based at least in part on the received packaging line data, planned production orders for one or more finished goods in each time bucket of a planning period;
        modify the identified planned production orders without considering time and tank capacity constraints of one or more semi-finished goods and lot-size requirements of production operations of the one or more finished goods by:
            pulling one or more of the planned production orders to earlier time buckets when a remaining amount of a semi-finished good in an earlier time bucket is greater than or equal to an amount of the semi-finished good utilized for the planned production order;
            canceling one or more of the planned production orders when an excess amount of a finished good is greater than or equal to a planned production order in a future time bucket;
            updating the remaining amount of the semi-finished good in a time bucket based, at least in part, on an amount of the semi-finished good utilized for the one or more pulled production orders;
            generating the excess amount by allocating a portion of a semi-finished good in a time bucket to production of one or more finished goods having a non-zero production amount in the time bucket; and
            updating the excess amount based, at least in part, on the one or more canceled planned production orders;
        calculate a demand ratio comprising a calculated allocation of a split of material to the one or more finished goods;
        generate a tank-based production plan based, at least in part, on the modified planned production orders; and
        produce the one or more finished goods according to the tank-based production plan, based at least in part on control of the one or more tanks of the tank storage system and the one or more packaging lines of the packaging lines system.

2. The system of claim 1, wherein the planned production orders are further identified based on one or more of: tank capacity, stored material, a production stage, a concentration and data indicating freshness.

3. The system of claim 1, wherein the planned production orders are further identified based on an identity of one or more materials that can be stored in a tank.

4. The system of claim 1, wherein the one or more finished goods have a shelf life.

5. The system of claim 1, wherein the planned production orders are further identified based on one or more of: one or more handling procedures, one or more production procedures and one or more recipes.

6. The system of claim 1, wherein the one or more sensors comprise one or more RFID sensors.

7. A multi-level tank-based production method, comprising:
    receiving, by a computer comprising a processor and memory, data characterizing one or more tanks of a tank storage system and one or more packaging lines of a packaging lines system, the received data based at least in part on data received from one or more sensors affixed to one or more devices associated with the one or more tanks and the one or more packaging lines;
    identifying, by the computer, based at least in part on the received packaging line data, planned production orders for one or more finished goods in each time bucket of a planning period;
    modifying, by the computer, the identified planned production orders without considering time and tank capacity constraints of one or more semi-finished goods and lot-size requirements of production operations of the one or more finished goods by:
        pulling one or more of the planned production orders to earlier time buckets when a remaining amount of a semi-finished good in an earlier time bucket is greater than or equal to an amount of the semi-finished good utilized for the planned production order;
        canceling one or more of the planned production orders when an excess amount of a finished good is greater than or equal to a planned production order in a future time bucket;
        updating the remaining amount of the semi-finished good in a time bucket based, at least in part, on an amount of the semi-finished good utilized for the one or more pulled production orders;
        generating the excess amount by allocating a portion of a semi-finished good in a time bucket to production of one or more finished goods having a non-zero production amount in the time bucket; and
        updating the excess amount based, at least in part, on the one or more canceled planned production orders;
    calculating, by the computer, a demand ratio comprising a calculated allocation of a split of material to the one or more finished goods;
    generating, by the computer, a tank-based production plan based, at least in part, on the modified planned production orders; and
    producing, by production operations, the one or more finished goods according to the tank-based production plan, based at least in part on control of the one or more tanks of the tank storage system and the one or more packaging lines of the packaging lines system.

8. The method of claim 7, wherein the planned production orders are further identified based on one or more of: tank capacity, stored material, a production stage, a concentration and data indicating freshness.

9. The method of claim 7, wherein the planned production orders are further identified based on an identity of one or more materials that can be stored in a tank.

10. The method of claim 7, wherein the one or more finished goods have a shelf life.

11. The method of claim 7, wherein the planned production orders are further identified based on one or more of:
one or more handling procedures, one or more production procedures and one or more recipes.

12. The method of claim 7, wherein the one or more sensors comprise one or more RFID sensors.

13. A non-transitory computer-readable medium embodied with software, the software when executed:
receives data characterizing one or more tanks of a tank storage system and one or more packaging lines of a packaging lines system, the received data based at least in part on data received from one or more sensors affixed to one or more devices associated with the one or more tanks and the one or more packaging lines;
identifies based at least in part on the received packaging line data, planned production orders for one or more finished goods in each time bucket of a planning period;
modifies the identified planned production orders without considering time and tank capacity constraints of one or more semi-finished goods and lot-size requirements of production operations of the one or more finished goods by:
pulling one or more of the planned production orders to earlier time buckets when a remaining amount of a semi-finished good in an earlier time bucket is greater than or equal to an amount of the semi-finished good utilized for the planned production order;
canceling one or more of the planned production orders when an excess amount of a finished good is greater than or equal to a planned production order in a future time bucket;
updating the remaining amount of the semi-finished good in a time bucket based, at least in part, on an amount of the semi-finished good utilized for the one or more pulled production orders;
generating the excess amount by allocating a portion of a semi-finished good in a time bucket to production of one or more finished goods having a non-zero production amount in the time bucket; and
updating the excess amount based, at least in part, on the one or more canceled planned production orders;
calculates a demand ratio comprising a calculated allocation of a split of material to the one or more finished goods;
generates a tank-based production plan based, at least in part, on the modified planned production orders; and
produces, by production operations, the one or more finished goods according to the tank-based production plan, based at least in part on control of the one or more tanks of the tank storage system and the one or more packaging lines of the packaging lines system.

14. The non-transitory computer-readable medium of claim 13, wherein the planned production orders are further identified based on one or more of:
tank capacity, stored material, a production stage, a concentration and data indicating freshness.

15. The non-transitory computer-readable medium of claim 13, wherein the planned production orders are further identified based on an identity of one or more materials that can be stored in a tank.

16. The non-transitory computer-readable medium of claim 13, wherein the one or more finished goods have a shelf life.

17. The non-transitory computer-readable medium of claim 13, wherein the planned production orders are further identified based on one or more of:
one or more handling procedures, one or more production procedures and one or more recipes.

* * * * *